US011949166B2

(12) United States Patent
Li et al.

(10) Patent No.: US 11,949,166 B2
(45) Date of Patent: Apr. 2, 2024

(54) ANTENNA AND METHODS FOR MANUFACTURING AND OPERATING THE SAME

(71) Applicant: CommScope Technologies LLC, Hickory, NC (US)

(72) Inventors: Chengliang Li, Suzhou (CN); Bo Wu, Suzhou (CN)

(73) Assignee: CommScope Technologies LLC, Claremont, NC (US)

( * ) Notice: Subject to any disclaimer, the term of this patent is extended or adjusted under 35 U.S.C. 154(b) by 271 days.

(21) Appl. No.: 17/526,030

(22) Filed: Nov. 15, 2021

(65) Prior Publication Data

US 2022/0158360 A1 May 19, 2022

(30) Foreign Application Priority Data

Nov. 17, 2020 (CN) ......................... 202011285379.7

(51) Int. Cl.
*H01Q 21/24* (2006.01)
*H01Q 1/24* (2006.01)

(52) U.S. Cl.
CPC ............. *H01Q 21/24* (2013.01); *H01Q 1/246* (2013.01)

(58) Field of Classification Search
CPC ........ H01Q 21/24; H01Q 5/40; H01Q 21/061; H01Q 25/002; H01Q 1/246; H01Q 1/36; H01Q 1/002; H01Q 1/52; H01Q 21/0087
See application file for complete search history.

(56) References Cited

U.S. PATENT DOCUMENTS

2005/0003864 A1* 1/2005 Elliot ................... H01Q 3/2629 455/562.1
2009/0096700 A1* 4/2009 Chair ..................... H01Q 1/246 343/797

FOREIGN PATENT DOCUMENTS

| | | | |
|---|---|---|---|
| CN | 106571537 | A | 4/2017 |
| CN | 108767494 | A | 11/2018 |
| CN | 109273828 | A | 1/2019 |
| CN | 107230845 | B | 11/2020 |
| JP | 2001156523 | A | 6/2001 |
| WO | 2007010164 | A2 | 1/2007 |
| WO | 2017211451 | A1 | 12/2017 |

OTHER PUBLICATIONS

"Extended European Search Report for European Application No. 21208562.5, dated Apr. 13, 2022, 17 pages".
"European Office Action in Correspondence with Patent Application No. 21208562.5 dated Mar. 30, 2023, 81 pages".

* cited by examiner

*Primary Examiner* — Dieu Hien T Duong
(74) *Attorney, Agent, or Firm* — Myers Bigel, P.A.

(57) ABSTRACT

An antenna includes a first column of main radiating elements, each main radiating element configured to operate in a first operating frequency band and a first auxiliary radiating element. The first auxiliary radiating element is adjacent a first main radiating element in the first column of main radiating elements, and the first auxiliary radiating element is configured to radiate an electromagnetic wave that is substantially antiphase to an electromagnetic wave radiated by the first main radiating element.

17 Claims, 10 Drawing Sheets

ANTENNA AND METHODS FOR MANUFACTURING AND OPERATING THE SAME

CROSS-REFERENCE TO RELATED APPLICATION

The present application claims priority to Chinese Patent Application No. 202011285379.7, filed Nov. 17, 2020, the entire content of which is incorporated herein by reference as if set forth fully herein.

FIELD

The present disclosure generally relates to the field of antennas, and more specifically to an antenna and methods for manufacturing and operating the same

BACKGROUND

Antenna systems are widely used in wireless communication systems. Wide beam width antennas have been used in various wireless communication environments, such as cellular communication systems, radar systems, and target tracking in military applications. In order to obtain a larger antenna coverage, it is desirable to make the antenna have a wide horizontal beam width.

SUMMARY

According to an aspect of the present disclosure, an antenna is provided, and the antenna includes: a first column of main radiating elements, each main radiating element configured to operate in a first operating frequency band; and a first auxiliary radiating element, wherein the first auxiliary radiating element is adjacent a first main radiating element in the first column of main radiating elements, and the first auxiliary radiating element is configured to radiate an electromagnetic wave that is substantially antiphase to an electromagnetic wave radiated by the first main radiating element.

In some embodiments, the first auxiliary radiating element is adjacent the first main radiating element in a direction perpendicular to an axis defined by the first column of main radiating elements.

In some embodiments, the first auxiliary radiating element is rotated 180° relative to the first main radiating element and the first main radiating element is configured to be fed with a first component of a signal, the first auxiliary radiating element is configured to be fed with a second component of the signal, and the first component and the second component of the signal are in phase with each other.

In some embodiments, the first main radiating element and the first auxiliary radiating element are respectively connected to a first output terminal and a second output terminal of a power splitter, and outputs of the power splitter at the first output terminal and the second output terminal are in phase with each other.

In some embodiments, the first main radiating element and the first auxiliary radiating element are respectively connected to corresponding output terminals of an in-phase coupler.

In some embodiments, the first auxiliary radiating element is oriented in the same direction as the first main radiating element, and the first main radiating element is configured to be fed with a first component of a signal, the first auxiliary radiating element is configured to be fed with a second component of the signal, and the first component and the second component of the signal are substantially antiphase to each other.

In some embodiments, a phase difference between the first component and the second component of the signal is between 160° to 180°.

In some embodiments, the first main radiating element is connected to a first output terminal of a power splitter, the first auxiliary radiating element is connected to a second output terminal of the power splitter via a phase modulation circuit, and the phase modulation circuit is configured such that the first component fed into the first main radiating element and the second component fed into the first auxiliary radiating element are substantially antiphase to each other.

In some embodiments, outputs of the power splitter at the first output terminal and the second output terminal are in phase with each other.

In some embodiments, the power splitter is an in-phase coupler.

In some embodiments, outputs of the power splitter at the first output terminal and the second output terminal have different phases.

In some embodiments, the second component of the signal has an amplitude that is less than 10% of an amplitude of the first component of the signal.

In some embodiments, the first main radiating element is an uppermost main radiating element or a lowermost main radiating element in the first column of main radiating elements.

In some embodiments, the antenna further comprises a second auxiliary radiating element, wherein, the second auxiliary radiating element is adjacent a second main radiating element that is different from the first main radiating element in the first column of main radiating elements, and the second auxiliary radiating element is configured to radiate an electromagnetic wave that is substantially antiphase to an electromagnetic wave radiated by the second main radiating element.

In some embodiments, the second main radiating element is closer to a central portion of the first column of main radiating elements than the first main radiating element, and an amplitude of a signal component fed to the second auxiliary radiating element is smaller than that of a signal component fed to the first auxiliary radiating element.

In some embodiments, the antenna further comprises a second column of main radiating elements that is adjacent the first column of main radiating elements, the first column of main radiating elements and the second column of main radiating elements are fed separately, and a main radiating element in the second column of main radiating elements corresponding to the first main radiating element is adjacent the first auxiliary radiating element, and the first auxiliary radiating element is configured to radiate an electromagnetic wave that is substantially antiphase to an electromagnetic wave radiated by the main radiating element in the second column of main radiating elements corresponding to the first main radiating element.

In some embodiments, the first auxiliary radiating element is between the first column of main radiating elements and the second column of main radiating elements and positioned either above or below the first column of main radiating elements and the second column of main radiating elements.

In some embodiments, the antenna further comprises: a second column of main radiating elements that is adjacent the first column of main radiating elements; and a third auxiliary radiating element, wherein the first column of main radiating elements and the second column of main radiating elements are fed separately, wherein the third auxiliary radiating element is adjacent a third main radiating element in the second column of main radiating elements, and the third auxiliary radiating element is configured to radiate an electromagnetic wave that is substantially antiphase to an electromagnetic wave radiated by the third main radiating element, and wherein, the first column of main radiating elements and the second column of main radiating elements are vertically shifted relative to each other, the first auxiliary radiating element is located above the second column of main radiating elements, and the third auxiliary radiating element is located below the first column of main radiating elements.

In some embodiments, the antenna further comprises: a third auxiliary radiating element; a second column of main radiating elements; a third column of main radiating elements; and a fourth column of main radiating elements, wherein the first column of main radiating elements, the second column of main radiating elements, the third column of main radiating elements, and the fourth column of main radiating elements are arranged in the stated order adjacent one another in a direction transverse to an axis defined by the first column of main radiating elements and are fed separately, and the second column of main radiating elements and the fourth column of main radiating elements are vertically shifted relative to the first column of main radiating elements and the third column of main radiating elements, wherein, a main radiating element in the third column of main radiating elements corresponding to the first main radiating element is adjacent the first auxiliary radiating element, the first auxiliary radiating element is configured to radiate an electromagnetic wave that is substantially antiphase to an electromagnetic wave radiated by the main radiating element in the third column of main radiating elements corresponding to the first main radiating element, and the first auxiliary radiating element is located above the second column of main radiating elements, wherein, the third auxiliary radiating element is adjacent a third main radiating element in the second column of main radiating elements, and the third auxiliary radiating element is configured to radiate an electromagnetic wave that is substantially antiphase to an electromagnetic wave radiated by the third main radiating element, and wherein, a main radiating element in the fourth column of main radiating elements corresponding to the third main radiating element is adjacent the third auxiliary radiating element, the third auxiliary radiating element is configured to radiate an electromagnetic wave that is substantially antiphase to an electromagnetic wave radiated by the main radiating element in the fourth column of main radiating elements corresponding to the third main radiating element, and the third auxiliary radiating element is located below the third column of main radiating elements.

In some embodiments, the antenna further comprises a first column of second frequency band main radiating elements, each second frequency band main radiating element configured to operate in a second operating frequency band different from the first operating frequency band.

In some embodiments, an auxiliary radiating element is adjacent a second frequency band main radiating element in the first column of second frequency band main radiating elements, and the auxiliary radiating element is configured to radiate an electromagnetic wave that is substantially antiphase to an electromagnetic wave radiated by the second frequency band main radiating element.

According to another aspect of the present disclosure, a method of manufacturing an antenna is provided, and the method includes: arranging a plurality of main radiating elements that are configured to operate in a first operating frequency band in at least one column; and arranging a first auxiliary radiating element adjacent a first main radiating element in a first column of the at least one column, the first auxiliary radiating element being configured to radiate an electromagnetic wave that is substantially antiphase to an electromagnetic wave radiated by the first main radiating element.

According to further another aspect of the present disclosure, a method of operating an antenna is provided, and the antenna includes at least one column of main radiating elements, each main radiating element being configured to operate in a first operating frequency band, wherein a first auxiliary radiating element is adjacent a first main radiating element in a first column of main radiating elements of the at least one column of main radiating elements, and the method includes: causing the first column of main radiating elements to radiate a first electromagnetic wave; and causing the first auxiliary radiating element to radiate a second electromagnetic wave that is substantially antiphase to the first electromagnetic wave.

Through the following detailed descriptions of exemplary embodiments of the present disclosure by the accompanying drawings, other features and advantages of the present disclosure will become clearer.

BRIEF DESCRIPTION OF THE DRAWING

The foregoing and other features and advantages of the present disclosure will become clear from the following descriptions of the embodiments of the present disclosure shown in conjunction with the accompanying drawings. The accompanying drawings are incorporated herein and form a part of the descriptions to further explain the principles of the present disclosure and enable those skilled in the art to make and use the present disclosure.

Figure 1A:
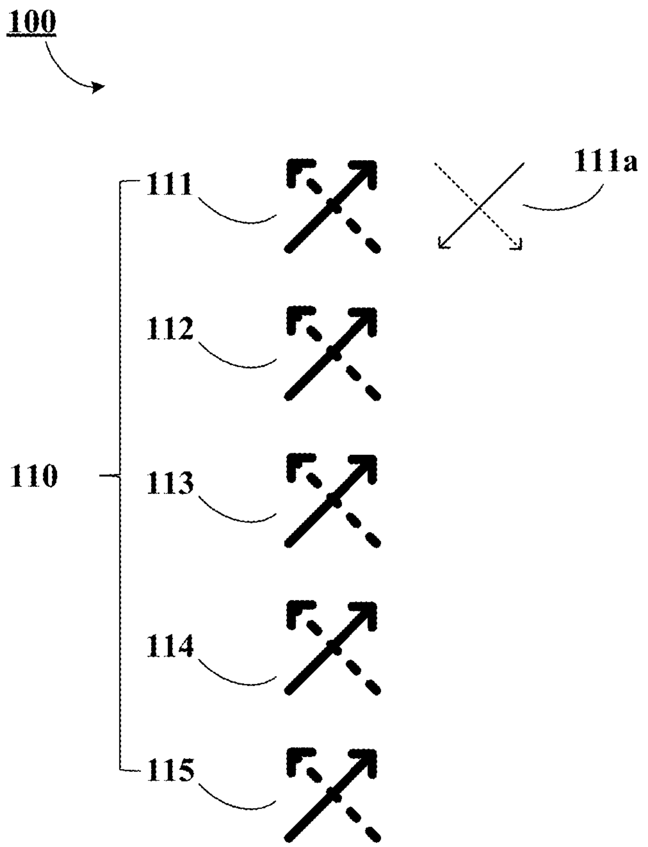
FIG. 1A is a front view schematically showing an antenna according to some embodiments of the present disclosure.

In the embodiments described below, the same signs are sometimes used in common between different drawings to denote the same parts or parts with the same functions, and repeated descriptions thereof are omitted. In some cases, similar labels and letters are used to indicate similar items. Therefore, once an item is defined in one figure, it does not need to be further discussed in subsequent figures.

For ease of understanding, the position, dimension, and range of each structure shown in the drawings and the like may not indicate the actual position, dimension, and range. Therefore, the present disclosure is not limited to the positions, dimensions, and ranges disclosed in the drawings and the like.

DETAILED DESCRIPTION

Various exemplary embodiments of the present disclosure will be described in detail below with reference to the accompanying drawings. It should be noted: unless otherwise specifically stated, the relative arrangement, numerical expressions and numerical values of components and steps set forth in these embodiments do not limit the scope of the present disclosure.

The following description of at least one exemplary embodiment is actually only illustrative, and in no way serves as any limitation to the present disclosure and its application or use. In other words, the structure and method herein are shown in an exemplary manner to illustrate different embodiments of the structure and method in the present disclosure. However, those skilled in the art will understand that they only illustrate exemplary ways of implementing the present disclosure, rather than exhaustive ways. In addition, the drawings are not necessarily drawn to scale, and some features may be enlarged to show details of specific components.

In addition, the technologies, methods, and equipment known to those of ordinary skill in the art may not be discussed in detail, but where appropriate, the technologies, methods, and equipment should be regarded as part of the granting descriptions.

In all examples shown and discussed herein, any specific value should be construed as merely exemplary and not as limiting. Therefore, other examples of the exemplary embodiment may have different values.

It should be noted that the drawings of the present disclosure merely schematically show relative positional relations of the components of the antenna according to the embodiments of the present disclosure, and unless otherwise specified, the specific structure of each component is not particularly limited. It should also be noted that the antenna may further include additional components that are neither discussed herein nor shown in the drawings so as to avoid obscuring the main points of the present disclosure.

FIG. 1A schematically shows an antenna 100 according to some embodiments of the present disclosure. The antenna 100 may include at least one column of main radiating elements, and each main radiating element in the at least one column of main radiating elements is configured to operate in a first operating frequency band. FIG. 1A schematically shows a column of main radiating elements 110 included in the antenna 100, and the column of main radiating elements 110 includes main radiating elements 111, 112, 113, 114, and 115 configured to operate in a first operating frequency band.

It can be understood that although FIG. 1A only exemplarily shows one column of main radiating elements, the antenna 100 may include more columns of main radiating elements, and each column of main radiating elements may include a greater or smaller number of main radiating elements. Auxiliary radiating elements (which will be described later) may be provided for some or all of the at least one column of main radiating elements included in the antenna 100 like the column 110 shown in FIG. 1. In addition, the antenna 100 may also be a multi-band antenna, and may further include one or more columns of main radiating elements configured to operate in other operating frequency bands. It can also be understood that although the radiating elements in the antenna 100 are shown as dual-polarization radiating elements (for example, cross-dipole radiating elements), the radiating elements in the antenna 100 may also be single-polarization radiating elements.

As shown in FIG. 1A, in the column of main radiating elements 110, the main radiating element 111 has an auxiliary radiating element 111*a* arranged adjacent to the main radiating element 111. The auxiliary radiating element 111*a* is configured to radiate an electromagnetic wave that is substantially antiphase to an electromagnetic wave radiated by the main radiating element 111. The auxiliary radiating element 111*a* may operate in the first operating frequency band. In this way, a beam pattern generated by the combination of the main radiating element 111 and the auxiliary radiating element 111*a* can have an increased horizontal beam width. The term "substantially antiphase" as used herein may refer to a phase difference between two signals that is 180° or that deviates from 180° within a reasonable range, for example, the phase difference is between 160° to 180°, or between 170° to 180°, or between 175° to 180°, etc. The above reasonable range may refer to, for example, that a phase difference falling into the range makes a beam pattern generated by a main radiating element and an auxiliary radiating element together have an increased horizontal beam width relative to a beam pattern generated by the main radiating element only.

Figure 11A:
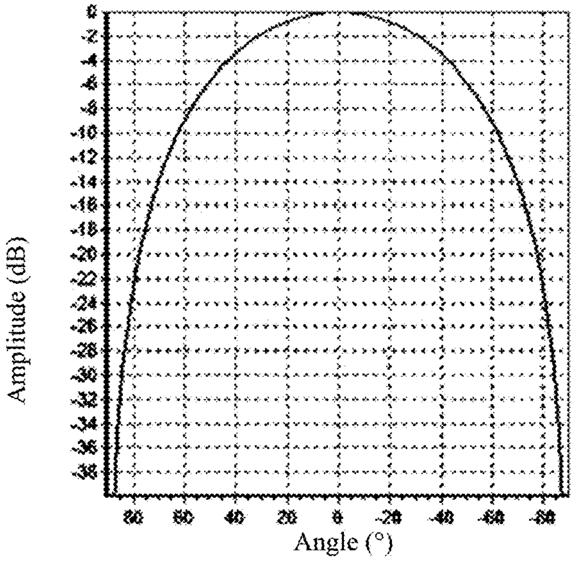
FIG. 11A and FIG. 11B are horizontal beam patterns of a single radiating element and two radiating elements arranged adjacent to each other and radiating electromagnetic waves antiphase to each other.
Figure 11B:
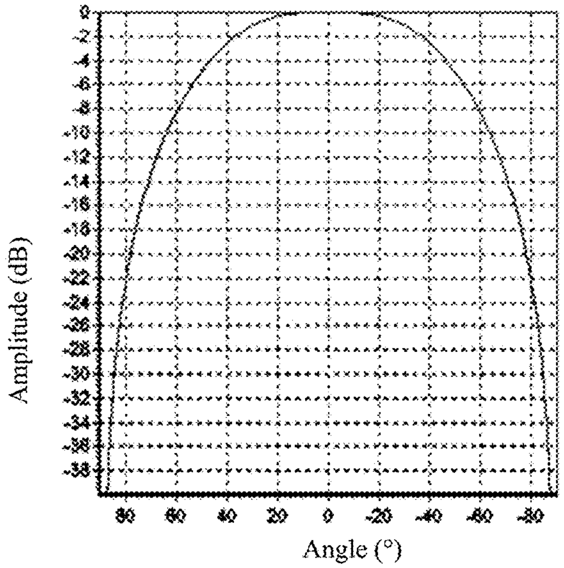

For example, referring to FIG. 11A and FIG. 11B, FIG. 11A shows a horizontal beam pattern generated by a single radiating element, and FIG. 11B shows a horizontal beam pattern generated by the single radiating element and a radiating element which is arranged adjacent to the single radiating element and radiates an electromagnetic wave 180° antiphase to the electromagnetic wave radiated by the single radiating element. Considering the horizontal beam width at 3 dB in FIG. 11A and FIG. 11B, it can be seen that comparing to the horizontal beam width of about 74.8° of the horizontal beam pattern generated by the single radiating element, the horizontal beam width of the horizontal beam pattern generated by two radiating elements configured as described above is increased to about 84°. Therefore, the antenna according to the embodiments of the present disclosure can have a significantly increased horizontal beam width.

As shown in FIG. 1A, in some embodiments, the auxiliary radiating element 111*a* may preferably be adjacent the main radiating element 111 in a direction perpendicular to an axis defined by the column of main radiating elements 110. In some other embodiments, the auxiliary radiating element 111*a* may be adjacent the main radiating element 111 in a direction obliquely crossing the column of main radiating elements 110. For example, when the antenna includes a plurality of columns of main radiating elements, the auxiliary radiating element may be arranged outside the array of the main radiating elements so that the auxiliary radiating element is adjacent to a corresponding main radiating element in a direction oblique crossing each column of main radiating elements, thereby making the arrangement of the radiating elements of the antenna more compact.

In order to enable the auxiliary radiating element 111*a* to radiate an electromagnetic wave that is substantially antiphase to the electromagnetic wave radiated by the main radiating element 111, in some embodiments, as shown in FIG. 1A, the auxiliary radiating element 111*a* is rotated 180° relative to the main radiating element 111. The main radiating element 111 is configured to be fed with a first component of a signal, the auxiliary radiating element 111*a* is configured to be fed with a second component of the signal, and the first component and the second component of the signal are in phase with each other. Although the main radiating element 111 and the corresponding auxiliary radiating element 111*a* are fed with in-phase signals, the 180° rotation of the auxiliary radiating element 111*a* relative to the main radiating element 111 makes the electromagnetic wave radiated by the auxiliary radiating element 111*a* naturally 180° antiphase to the electromagnetic wave radiated by the main radiating element 111, and thus an increased horizontal beam width can be obtained over the entire operating frequency band.

Figure 1B:
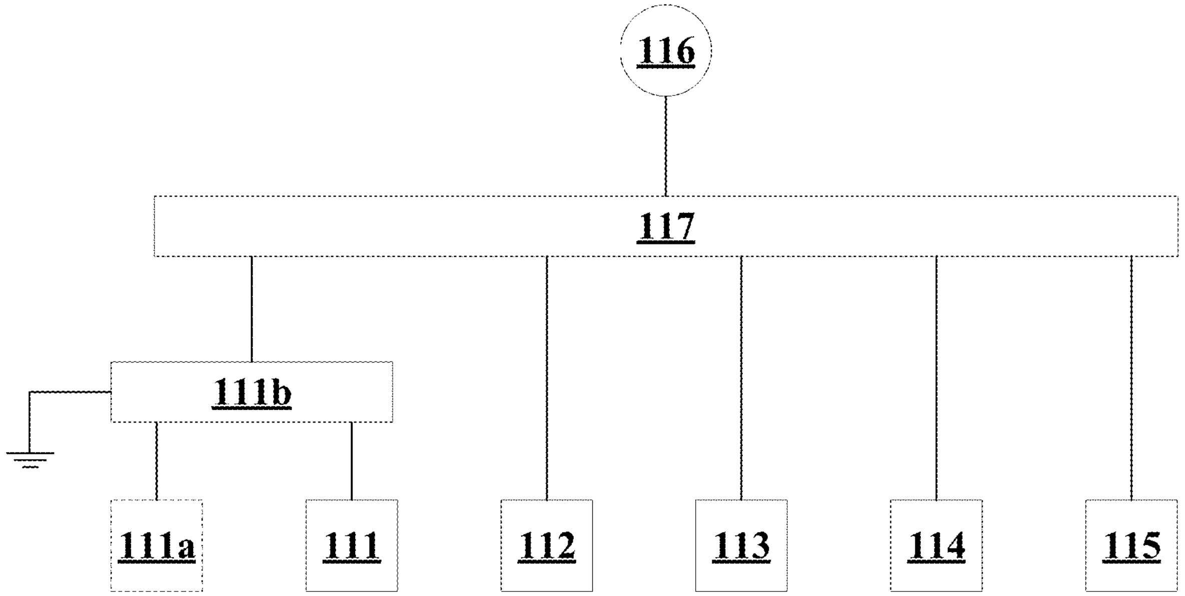
FIG. 1B is a diagram schematically showing a feed circuit of the antenna in FIG. 1A.

Next, an exemplary configuration of a feed circuit of the antenna in FIG. 1A will be described with reference to FIG. 1B. Main radiating elements located in the same column in the antenna 100 may be fed in common. For example, as shown in FIG. 1B, the main radiating elements 111, 112, 113, 114, and 115 may be fed in common by a signal source 116 via a phase shifter 117. In order to make the main radiating element 111 and the corresponding auxiliary radiating element 111*a* be fed with in-phase signals, the main radiating element 111 and the auxiliary radiating element 111*a* may be respectively connected to a first output terminal and a second output terminal of a power splitter 111*b*. The input terminal of the power splitter 111*b* is connected to one output terminal of the phase shifter 117, and the outputs of the power splitter 111*b* at the first output terminal and the second output terminal thereof are in phase with each other. In some embodiments, the power splitter 111*b* may be an in-phase coupler 111*b*, and the main radiating element 111 and the auxiliary radiating element 111*a* may be respectively connected to corresponding output terminals of the in-phase coupler 111*b*. Those skilled in the art can understand that in addition to the exemplary configuration shown in FIG. 1B, other feed circuit configurations that are known in the art or to be developed later can also be used to achieve desired feeding of the main radiating element 111 and the auxiliary radiating element 111*a*.

Figure 2A:
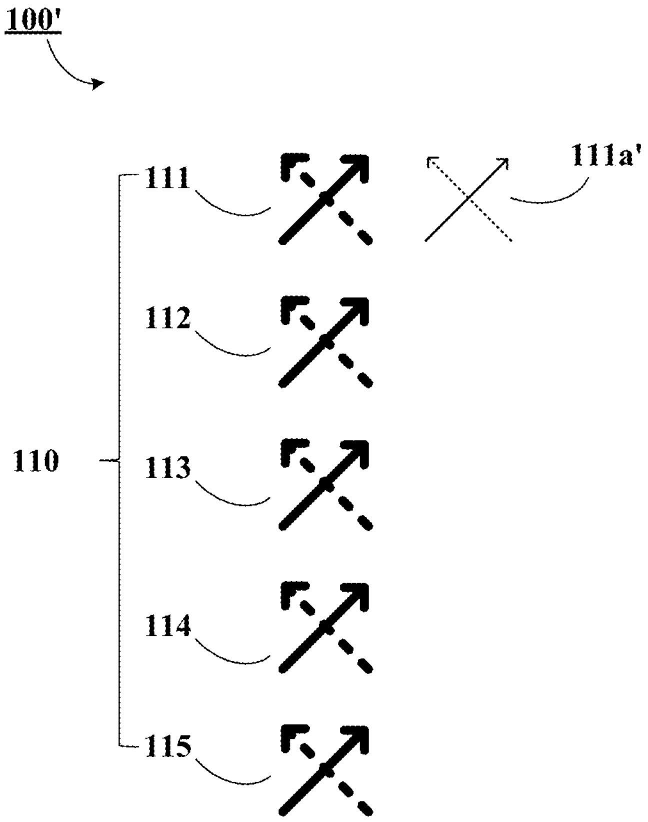
FIG. 2A is a front view schematically showing an antenna according to some embodiments of the present disclosure.

It is also possible to enable the auxiliary radiating element 111*a* to radiate an electromagnetic wave substantially antiphase to the electromagnetic wave radiated by the main radiating element 111 without rotating the auxiliary radiating element 111*a*. FIG. 2A schematically shows an antenna 100' according to some embodiments of the present disclosure. Comparing with the antenna 100, the difference of the antenna 100' only lies in that an auxiliary radiating element 111*a'* is not rotated by 180° relative to the main radiating element 111, instead, it is oriented in the same direction as the main radiating element 111. The main radiating element 111 is configured to be fed with a first component of a signal, an auxiliary radiating element 111*a'* is configured to be fed with a second component of the signal, and the first component and the second component of the signal are substantially antiphase to each other. In some examples, the phase difference between the first component and the second component of the signal is between 160° to 180°, or between 170° to 180°, or between 175° to 180°. Although the auxiliary radiating element 100*a'* in the antenna 100' is not rotated by 180°, relative to the main radiating element 111, the main radiating element 111 and the corresponding auxiliary radiating element 111*a'* are fed with signals substantially antiphase to each other, so that the electromagnetic wave radiated by the auxiliary radiating element 111*a'* is substantially antiphase to the electromagnetic wave radiated by the main radiating element 111. Therefore, an increased horizontal beam width can be obtained.

Figure 2B:
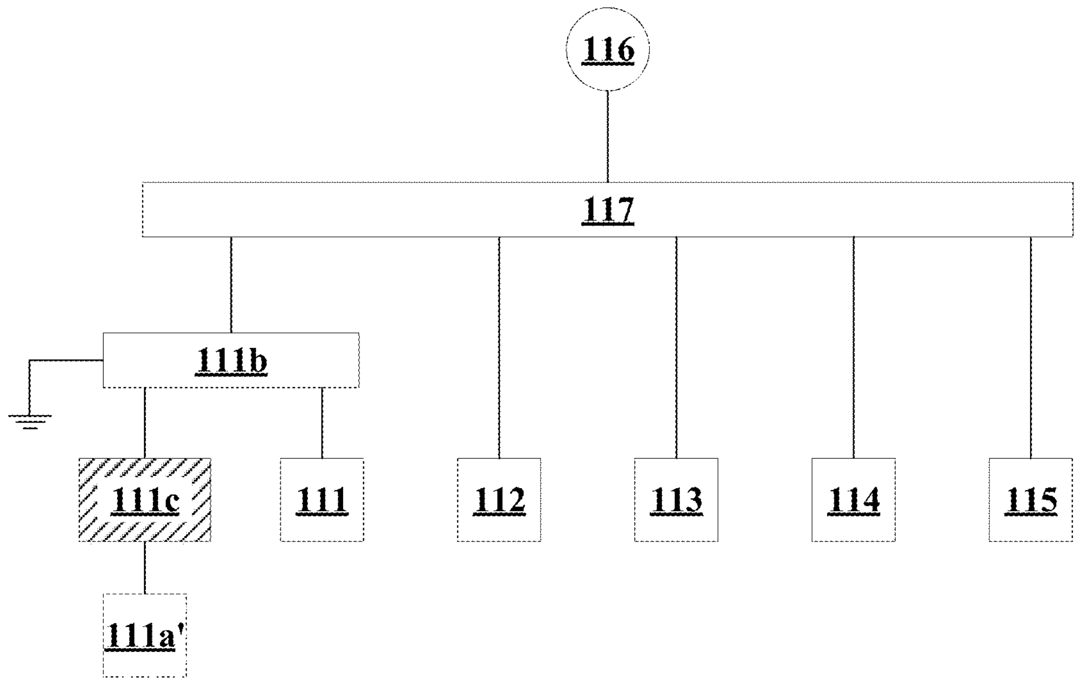
FIG. 2B is a diagram schematically showing a feed circuit of the antenna in FIG. 2A.

Next, an exemplary configuration of a feed circuit of the antenna in FIG. 2A will be described with reference to FIG. 2B. Similar to FIG. 1A, the main radiating elements 111, 112, 113, 114, and 115 may be fed in common by the signal source 116 via the phase shifter 117. The difference from FIG. 1A is that in order to make the main radiating element 111 and the corresponding auxiliary radiating element 111*a'* be fed with signals that are substantially antiphase to each other, the main radiating element 111 may be connected to the first output terminal of the power splitter 111*b*, and the auxiliary radiating element 111*a'* may be connected to the second output terminal of the power splitter 111*b* via a phase modulation circuit 111*c*, wherein the phase modulation circuit 111*c* is configured such that the first component fed into the main radiating element 111 is substantially antiphase to the second component fed into the auxiliary radiating element 111*a'*. The phase modulation circuit can be realized by using any suitable phase modulation technology, as long as it is possible to change a received signal component to have a desired phase to feed into the auxiliary radiating element.

In some embodiments, the outputs of the power splitter 111*b* at the first output terminal and the second output terminal thereof may be in phase with each other. In this case, the phase difference between the first component fed into the main radiating element 111 and the second component fed into the auxiliary radiating element 111*a'* is completely provided by the phase modulation circuit 111*c*. In some examples, the power splitter 111*b* may be an in-phase coupler 111*b*. In some other embodiments, the outputs of the power splitter 111*b* at the first output terminal and the second output terminal thereof may be in different phases. In this case, a part of the phase difference between the first component fed into the main radiating element 111 and the second component fed into the auxiliary radiating element 111*a'* is provided by the power splitter 111*b*, and the other part of the phase difference is provided by the phase modulation circuit 111*c*. As a non-limiting example, the output at the second output terminal of the power splitter 111*b* may be 90° out of phase relative to the output at the first output terminal, and the phase modulation circuit 111*c* may provide an additional phase difference of 70° to 110° so that the phase difference between the first component fed into the main radiating element 111 and the second component fed into the auxiliary radiating element 111*a'* is between 160° to 180°. Those skilled in the art can understand that in addition to the exemplary configuration shown in FIG. 2B, other feed circuit configurations that are known in the art or to be developed later can also be used to achieve desired feeding of the main radiating element 111 and the auxiliary radiating element 111*a'*.

For any configuration in the antenna 100 or the antenna 100', the energy fed into an auxiliary radiating element is generally much smaller than the energy fed into a main radiating element. In some embodiments, the amplitude of the second component fed into the auxiliary radiating element 111*a* or 111*a'* may be smaller than 10% of the amplitude of the first component fed into the main radiating element 111, for example, may be 5% or the like of the amplitude of the first component fed into the main radiating element 111. In some embodiments, as the auxiliary radiating element 111*a* or 111*a*' gets closer to the main radiating element 111, the ratio of the amplitude of the second component fed into the auxiliary radiating element 111*a* or 111*a*' to the amplitude of the first component fed into the main radiating element 111 increases.

In addition, although in FIG. 1A to FIG. 2B, the corresponding auxiliary radiating elements are arranged adjacent to the main radiating element 111 as examples, any one or more main radiating elements in the column 110 may have an auxiliary radiating element positioned adjacent thereto. In some embodiments, the uppermost main radiating element or the lowermost main radiating element in a column of main radiating elements may have an auxiliary radiating element positioned adjacent thereto. In other embodiments, the main radiating element in the middle of a column of main radiating elements may have an auxiliary radiating element positioned adjacent thereto.

Figure 3A:
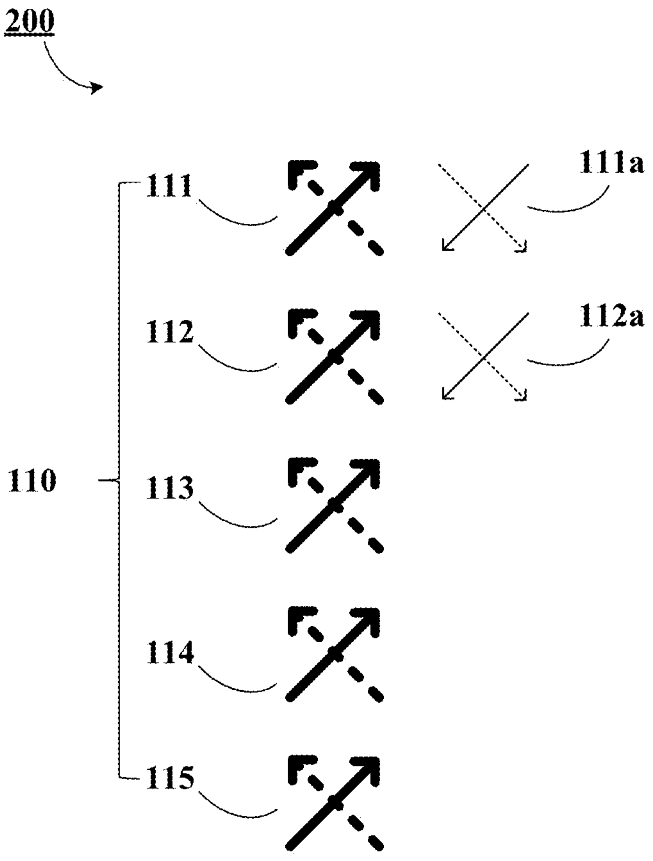
FIG. 3A is a front view schematically showing an antenna according to some embodiments of the present disclosure.
Figure 3B:
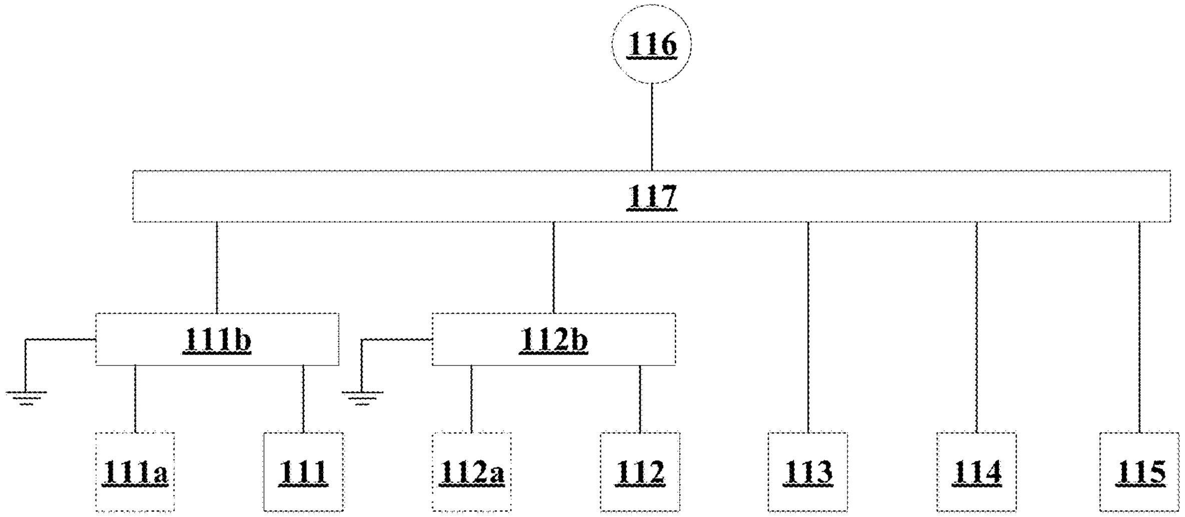
FIG. 3B is a diagram schematically showing a feed circuit of the antenna in FIG. 3A.

FIG. 3A schematically shows an antenna 200 according to some embodiments of the present disclosure. Compared to the antenna 100, the antenna 200 further includes an auxiliary radiating element 112*a* that is adjacent the main radiating element 112, and the auxiliary radiating element 112*a* is configured to radiate an electromagnetic wave that is substantially antiphase to the electromagnetic wave radiated by the main radiating element 112. The auxiliary radiating element 112*a* may operate in a first operating frequency band. The auxiliary radiating element 112*a* is rotated 180° relative to the main radiating element 112. The main radiating element 112 is configured to be fed with a first component of a signal, the auxiliary radiating element 112*a* is configured to be fed with a second component of the signal, and the first component and the second component of the signal are in phase with each other. For example, referring to FIG. 3B, the main radiating elements 111, 112, 113, 114, and 115 may be fed in common by the signal source 116 via the phase shifter 117. In order to make the main radiating element 111 and the corresponding auxiliary radiating element 111*a*, the main radiating element 112 and the corresponding auxiliary radiating element 112*a* be fed with in-phase signals, the main radiating element 111 and the auxiliary radiating element 111*a* may be respectively connected to the first output terminal and the second output terminal of the power splitter 111*b*, and the main radiating element 112 and the auxiliary radiating element 112*a* may be respectively connected to a first output terminal and a second output terminal of a power splitter 112*b*. The input terminals of the power splitters 111*b* and 112*b* are respectively connected to the corresponding output terminals of the phase shifter 117, and the outputs of the power splitters 111*b* and 112*b* at the first output terminals and the second output terminals thereof are in phase with each other. In some embodiments, the power splitters 111*b* and 112*b* may be in-phase couplers. Any of the configurations described above with reference to FIG. 1B can be applied to the main radiating element 112 and the corresponding auxiliary radiating element 112*a*.

Figure 4A:
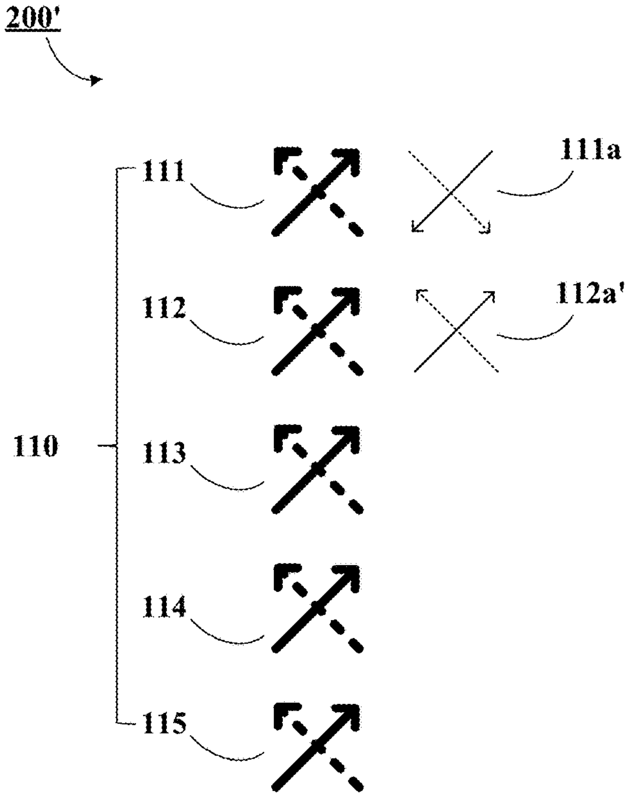
FIG. 4A is a front view schematically showing an antenna according to some embodiments of the present disclosure.
Figure 4B:
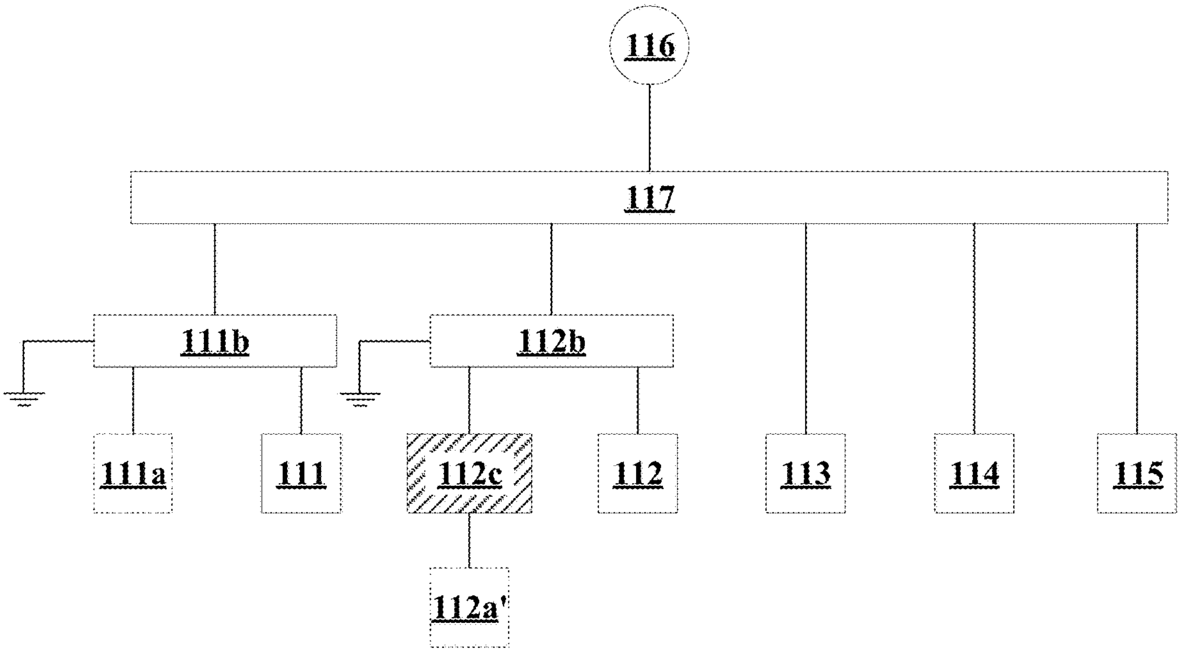
FIG. 4B is a diagram schematically showing a feed circuit of the antenna in FIG. 4A.

FIG. 4A schematically shows an antenna 200' according to some embodiments of the present disclosure. Compared to the antenna 100, the antenna 200' further includes an auxiliary radiating element 112*a*' that is adjacent the main radiating element 112, and the auxiliary radiating element 112*a*' is configured to radiate an electromagnetic wave that is substantially antiphase to the electromagnetic wave radiated by the main radiating element 112. The auxiliary radiating element 112*a*' may operate in a first operating frequency band. The auxiliary radiating element 112*a*' is oriented in the same direction as the main radiating element 112. The main radiating element 112 is configured to be fed with a first component of a signal, the auxiliary radiating element 112*a*' is configured to be fed with a second component of the signal, and the first component and the second component of the signal are substantially antiphase to each other. For example, referring to FIG. 4B, the main radiating elements 111, 112, 113, 114, and 115 may be fed in common by the signal source 116 via the phase shifter 117. In order to make the main radiating element 111 and the corresponding auxiliary radiating element 111*a* be fed with in-phase signals and to make the main radiating element 112 and the corresponding auxiliary radiating element 112*a*' be fed with signals that are substantially antiphase to each other, the main radiating element 111 and the auxiliary radiating element 111*a* may be respectively connected to the first output terminal and the second output terminal of the power splitter 111*b*, the main radiating element 112 may be connected to the first output terminal of the power splitter 112*b*, and the auxiliary radiating element 112*a*' may be connected to the second output terminal of the power splitter 112*b* via a phase modulation circuit 112*c*. The input terminals of the power splitters 111*b* and 112*b* are respectively connected to the corresponding output terminals of the phase shifter 117. Any of the configurations described above with reference to FIG. 2B can be applied to the main radiating element 112 and the corresponding auxiliary radiating element 112*a*'.

Although FIG. 3A and FIG. 4A respectively describe that the two auxiliary radiating elements use the configuration of FIG. 1A and the auxiliary radiating element 111*a* uses the configuration of FIG. 1A while the auxiliary radiating element 112*a*' uses the configuration of FIG. 2A, these are merely exemplary rather than restrictive. It can be understood that these auxiliary radiating elements can respectively use any one of the configurations shown in FIG. 1A and FIG. 2A.

In the examples shown in FIG. 3A and FIG. 4A, the main radiating element 112 is closer to the central portion of the column of main radiating elements 110 than the main radiating element 111. In this case, in some examples, the amplitudes of the signal components fed into the auxiliary radiating elements 112*a* and 112*a*' may be smaller than the amplitude of the signal component fed into the auxiliary radiating element 111*a*. In addition, although the auxiliary radiating element 111*a* and the auxiliary radiating elements 112*a* and 112*a*' are in the same column in the examples shown in FIG. 3A and FIG. 4A, these are merely exemplary rather than restrictive. The distance between the auxiliary radiating element 111*a* and the corresponding main radiating element 111 does not need to be the same as the distance between the auxiliary radiating elements 112*a*, 112*a*' and the corresponding main radiating element 112, and can be specifically set according to the desired beam pattern in consideration of various factors (such as the amplitude of the feed signal).

FIGS. 5 to 8 respectively describe examples of antennas including a plurality of columns of main radiating elements according to the embodiments of the present disclosure. In these drawings, the auxiliary radiating elements are all shown as using the configuration shown in FIG. 1A. However, these are merely exemplary. Part or all of the auxiliary radiating elements may also use the configuration shown in FIG. 2A, and the auxiliary radiating elements may also be provided for other main radiating elements.

Figure 5:
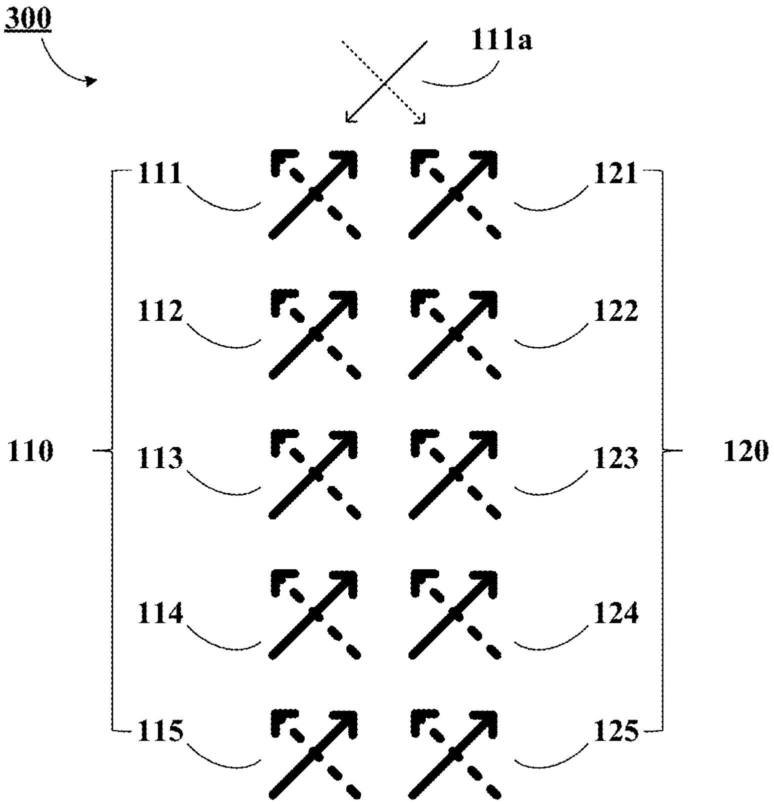
FIGS. 5 to 8 are front views schematically showing antennas according to some embodiments of the present disclosure.

FIG. 5 schematically shows an antenna 300 according to some embodiments of the present disclosure. In addition to the first column of main radiating elements 110, the antenna 300 further includes a second column of main radiating elements 120 adjacent the first column of main radiating elements 110. The second column of main radiating elements 120 includes main radiating elements 121, 122, 123, 124, and 125 configured to operate in a first operating frequency band. The first column of main radiating elements 110 and the second column of main radiating elements 120 are fed separately. The main radiating element 121 in the second column of main radiating elements 120 corresponding to the main radiating element 111 is adjacent the auxiliary radiating element 111*a*, and the auxiliary radiating element 111*a* is configured to radiate an electromagnetic wave that is substantially antiphase to an electromagnetic wave radiated by the main radiating element 121. In some embodiments, the auxiliary radiating element 111*a* may be located between the first column of main radiating elements 110 and the second column of main radiating elements 120 and be adjacent the main radiating elements 111 and 121 respectively in a direction perpendicular to the first column of main radiating elements 110 and the second column of main radiating elements 120. In some other embodiments, for example, as shown in FIG. 5, the auxiliary radiating element 111*a* may be arranged between the first column of main radiating elements 110 and the second column of main radiating elements 120 and may be above both the first column of main radiating elements 110 and the second column of main radiating elements 120 (if the main radiating element corresponding to the auxiliary radiating element is closer to the bottom of the column, the auxiliary radiating element can be below the columns). In this way, the distance between the first column of main radiating elements 110 and the second column of main radiating elements 120 can be reduced, so that the overall arrangement of the antenna is more compact. In this case, the auxiliary radiating element 111*a* is shared by the main radiating elements 111 and 121. The auxiliary radiating element 111*a* may be connected to the same feed circuit as the main radiating element 111 (for example, as shown in FIG. 1B), or alternatively may be connected to the same feed circuit as the main radiating element 121.

Figure 6:
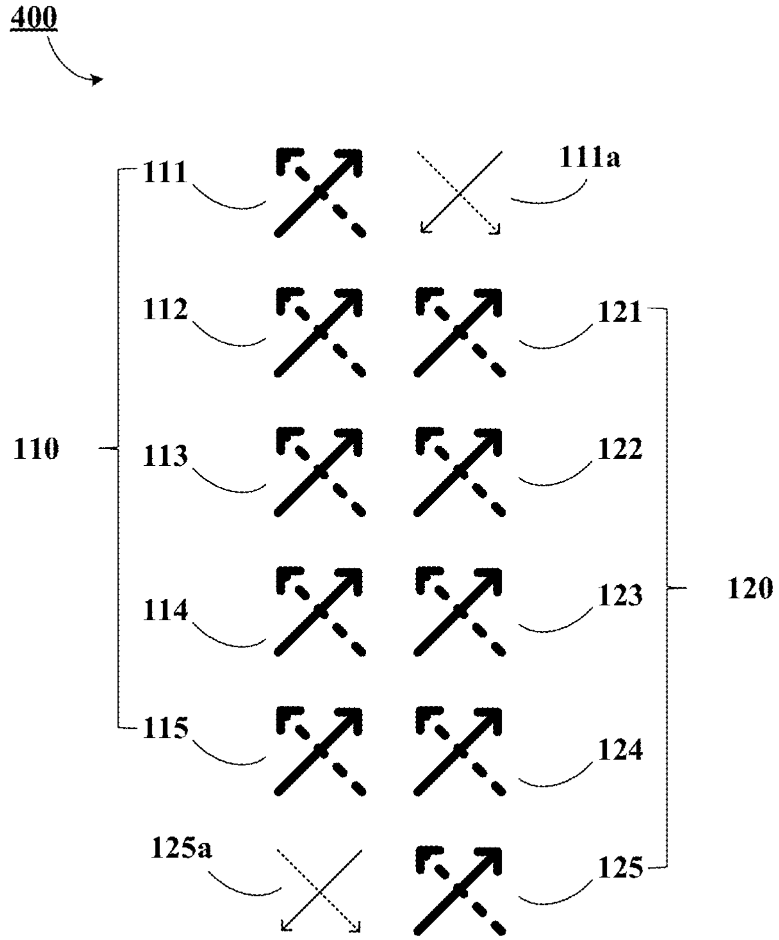

In some other embodiments, the second column of main radiating elements 120 may not share the auxiliary radiating element 111*a* with the first column of main radiating elements 110, but may be provided with a separate auxiliary radiating element. For example, FIG. 6 schematically shows an antenna 400 according to some embodiments of the present disclosure. In addition to the first column of main radiating elements 110, the antenna 400 further includes the second column of main radiating elements 120 that is adjacent the first column of main radiating elements 110. The second column of main radiating elements 120 includes the main radiating elements 121, 122, 123, 124, and 125 configured to operate in a first operating frequency band. The first column of main radiating elements 110 and the second column of main radiating elements 120 are fed separately. The main radiating element 125 in the second column of main radiating elements 120 has an auxiliary radiating element 125*a* arranged adjacent the main radiating element 125, and the auxiliary radiating element 125*a* is configured to radiate an electromagnetic wave that is substantially antiphase to an electromagnetic wave radiated by the main radiating element 125. The auxiliary radiating element 125*a* may operate in the first operating frequency band. As shown in FIG. 6, the first column of main radiating elements 110 and the second column of main radiating elements 120 are vertically shifted relative to each other, the auxiliary radiating element 111*a* is located above the second column of main radiating elements 120, and the auxiliary radiating element 125*a* is located below the first column of main radiating elements 110. In this way, the distance between the first column of main radiating elements 110 and the second column of main radiating elements 120 can be reduced, so that the overall arrangement of the antenna is more compact. In this case, the auxiliary radiating element 111*a* may be connected to the same feed circuit as the main radiating element 111, and the auxiliary radiating element 125*a* may be connected to the same feed circuit as the main radiating element 125.

It should be understood that although the auxiliary radiating element 111*a* is shown as being directly above the second column of main radiating elements 120 and the auxiliary radiating element 125*a* is shown as being directly below the first column of main radiating elements 110 in FIG. 6, these are not restrictive. The auxiliary radiating elements 111*a* and 125*a* do not need to be located in the same column as the corresponding main radiating elements 120 and 110, and the distance between them and the corresponding main radiating elements can be set separately from the distance between the columns of main radiating elements.

Figure 7:
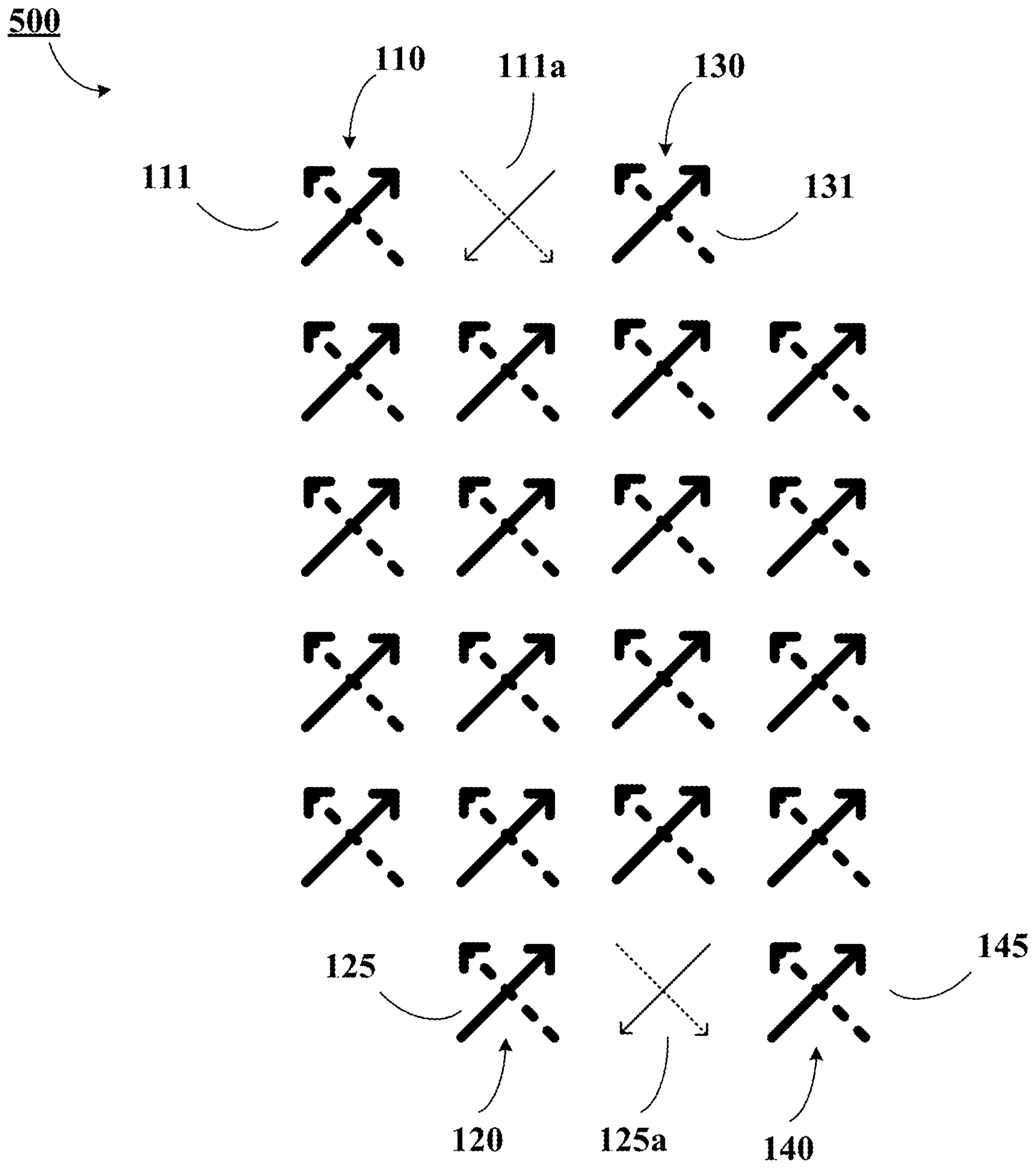

In other embodiments, two columns of main radiating elements adjacent a column of main radiating elements on opposite sides of the column of main radiating elements can share auxiliary radiating elements. For example, FIG. 7 schematically shows an antenna 500 according to some embodiments of the present disclosure. In addition to the first column of main radiating elements 110, the antenna 500 further includes a second column of main radiating elements 120, a third column of main radiating elements 130, and a fourth column of main radiating elements 140. The first column of main radiating elements 110, the second column of main radiating elements 120, the third column of main radiating elements 130, and the fourth column of main radiating elements 140 are arranged in the stated order adjacent to one another in a direction transverse to these columns and are fed separately, and the second column of main radiating elements 120 and the fourth column of main radiating elements 140 are vertically shifted relative to the first column of main radiating elements 110 and the third column of main radiating elements 130.

As shown in FIG. 7, the main radiating element 131 in the third column of main radiating elements 130 corresponding to the main radiating element 111 in the first column of main radiating elements 110 is adjacent the auxiliary radiating element 111*a*. The auxiliary radiating element 111*a* is configured to radiate an electromagnetic wave that is substantially antiphase to an electromagnetic wave radiated by the main radiating element 131. The auxiliary radiating element 111*a* is located above the second column of main radiating elements 120. The main radiating element 125 in the second column of main radiating elements 120 has an auxiliary radiating element 125*a* arranged adjacent the main radiating element 125, and the auxiliary radiating element 125*a* is configured to radiate an electromagnetic wave that is substantially antiphase to an electromagnetic wave radiated by the main radiating element 125. The auxiliary radiating element 125*a* may operate in a first operating frequency band. A main radiating element 145 in the fourth column of main radiating elements 140 corresponding to the main radiating element 125 is adjacent the auxiliary radiating element 125*a*, and the auxiliary radiating element 125*a* is configured to radiate an electromagnetic wave that is substantially antiphase to an electromagnetic wave radiated by the main radiating element 145. The auxiliary radiating element 125*a* is located below the third column of main radiating elements 130. In the example shown in FIG. 7, the second column of main radiating elements 120 and the fourth column of main radiating elements 140 are vertically shifted relative to the first column of main radiating elements 110 and the third column of main radiating elements 130, so that the auxiliary radiating element 111*a* shared by the first column of main radiating elements 110 and the third column of main radiating elements 130 is adjacent to the main radiating elements 111 and 131 in a direction perpendicular to an axis defined by the first column of main radiating elements 110 and the third column of main radiating elements 130, and the auxiliary radiating element 125*a* shared by the second column of main radiating elements 120 and the fourth column of main radiating elements 140 is adjacent the main radiating elements 125 and 145 in a direction perpendicular to an axis defined by the second column of main radiating elements 120 and the fourth column of main radiating elements 140. In this way, the overall arrangement of the antenna is more compact, and a smaller size can be achieved. In some examples, the first column of main radiating elements 110, the second column of main radiating elements 120, the third column of main radiating elements 130, and the fourth column of main radiating elements 140 may also be aligned, so that the auxiliary radiating element 111*a* shared by the first column of main radiating elements 110 and the third column of main radiating elements 130 is adjacent the main radiating elements 111 and 131 in a direction obliquely crossing the first column of main radiating elements 110 and the third column of main radiating elements 130, and the auxiliary radiating element 125*a* shared by the second column of main radiating elements 120 and the fourth column of main radiating elements 140 is adjacent the main radiating elements 125 and 145 in a direction obliquely crossing the second column of main radiating elements 120 and the fourth column of main radiating elements 140.

It should be understood that although the auxiliary radiating element 111*a* is shown as being directly above the second column of main radiating elements 120 and the auxiliary radiating element 125*a* is shown as being directly below the third column of main radiating elements 130 in FIG. 7, these are not restrictive. The auxiliary radiating elements 111*a* and 125*a* do not need to be located in the same column as the corresponding main radiating elements 130 and 110, and the distance between them and the corresponding main radiating elements can be set separately from the distance between the columns of main radiating elements.

Figure 8:
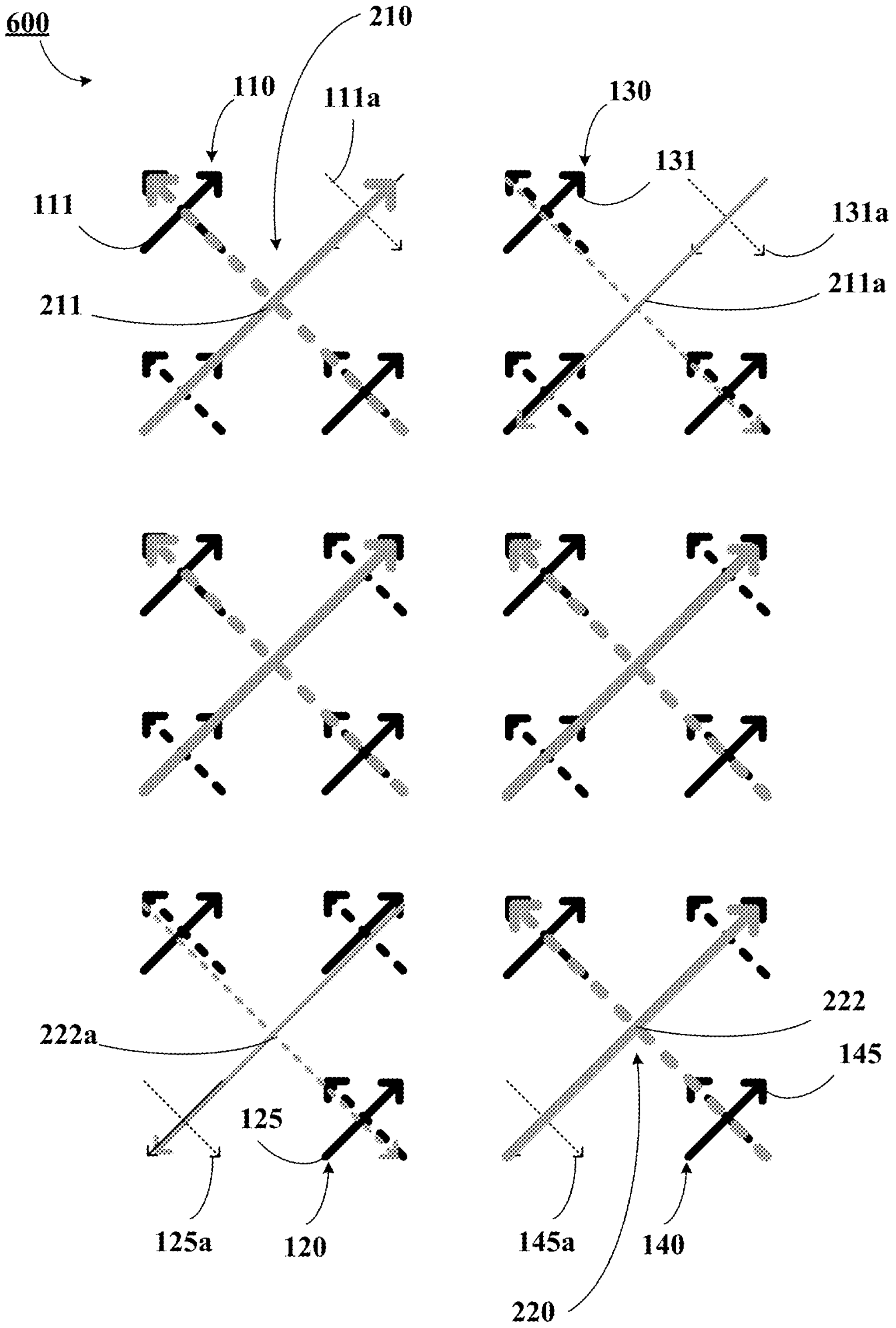

In some other embodiments, the antenna may further include at least one column of second frequency band main radiating elements, and each second frequency band main radiating element in the at least one column of second frequency band main radiating elements is configured to operate in a second operating frequency band different from the first operating frequency band. In some embodiments, a second frequency band main radiating element in a first column of the at least one column of second frequency band main radiating elements may have an auxiliary radiating element that is adjacent the second frequency band main radiating element, and the auxiliary radiating element is configured to radiate an electromagnetic wave that is substantially antiphase to an electromagnetic wave radiated by the second frequency band main radiating element. For example, FIG. 8 schematically shows an antenna 600 according to some embodiments of the present disclosure. Compared to the antenna 500, the antenna 600 further includes two columns of second frequency band main radiating elements 210 and 220, wherein a second frequency band main radiating element 211 in the first column of second frequency band main radiating elements 210 has an auxiliary radiating element 211*a* that is adjacent the second frequency band main radiating element 211, and the auxiliary radiating element 211*a* is configured to radiate an electromagnetic wave that is substantially antiphase to an electromagnetic wave radiated by the second frequency band main radiating element 211; a second frequency band main radiating element 222 in the second column of second frequency band main radiating elements 220 has an auxiliary radiating element 222*a* that is adjacent the second frequency band main radiating element 222, and the auxiliary radiating element 222*a* is configured to radiate an electromagnetic wave that is substantially antiphase to an electromagnetic wave radiated by the second frequency band main radiating element 222. The auxiliary radiating elements 211*a* and 222*a* can operate in the second frequency band. The first column of second frequency band main radiating elements 210 and the second column of second frequency band main radiating elements 220 are vertically shifted relative to each other, the auxiliary radiating element 211*a* is located above the second column of second frequency band main radiating elements 220, and the auxiliary radiating element 222*a* is located below the first column of second frequency band main radiating element 210. It should be understood that although the auxiliary radiating element 211*a* is shown as being right above the second column of second frequency band main radiating elements 220 and the auxiliary radiating element 222*a* is shown as being right below the first column of second frequency band main radiating elements 210 in FIG. 8, these are not restrictive. The auxiliary radiating elements 211*a* and 222*a* do not need to be located in the same column as the corresponding main radiating elements 220 and 210, and the distance between them and the corresponding main radiating elements can be set separately from the distance between the columns of main radiating elements.

In some embodiments, the first operating frequency band may be a low frequency band, and the second operating frequency band may be a high frequency band. In some embodiments, the first operating frequency band may be a high frequency band, and the second operating frequency band may be a low frequency band. The “low frequency band” used herein may refer to bands of relatively low frequencies such as, for example, the 600-960 MHz band or part thereof, and the “high frequency band” used herein may refer to bands of relatively high frequencies such as, for example, 1695-2690 MHz frequency bands or part thereof. The present disclosure is not limited to these specific frequency bands, and can be applied to any other frequency bands within the operating frequency range of the antenna. In addition, the present disclosure is also not limited to antennas with two operating frequency bands, and can be applied to antennas with more or fewer operating frequency bands.

The antenna according to the embodiments of the present disclosure can provide unexpected and surprising effects. Generally, additional radiating elements arranged in adjacent columns or between columns can be used to reduce the azimuth beam width. However, in the present disclosure, by adjacently arranging auxiliary radiating elements which radiate electromagnetic waves that are substantially antiphase to those of the main radiating elements, it is possible to obtain an increased horizontal beam width and provide improved gain and isolation.

Figure 9:
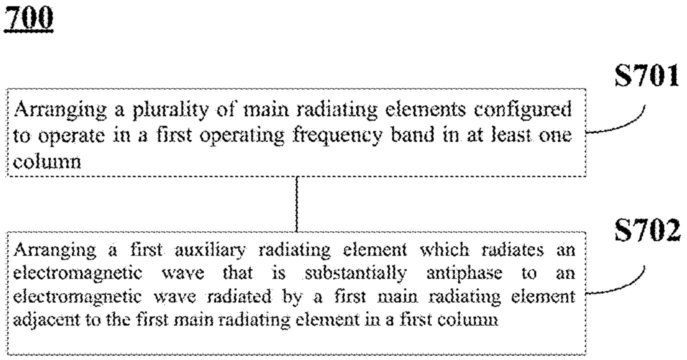
FIG. 9 is a flowchart showing a method of manufacturing an antenna according to some embodiments of the present disclosure.

In addition, the present disclosure further provides a method of manufacturing an antenna as described in any of the aforementioned embodiments. FIG. 9 shows a method 700 of manufacturing an antenna according to an embodiment of the present disclosure. The method 700 includes: in step S701, arranging a plurality of main radiating elements configured to operate in a first operating frequency band in at least one column; and in step S702, arranging a first auxiliary radiating element adjacent a first main radiating element in a first column of the at least one column, the first auxiliary radiating element being configured to radiate an electromagnetic wave that is substantially antiphase to an electromagnetic wave radiated by the first main radiating element.

Figure 10:
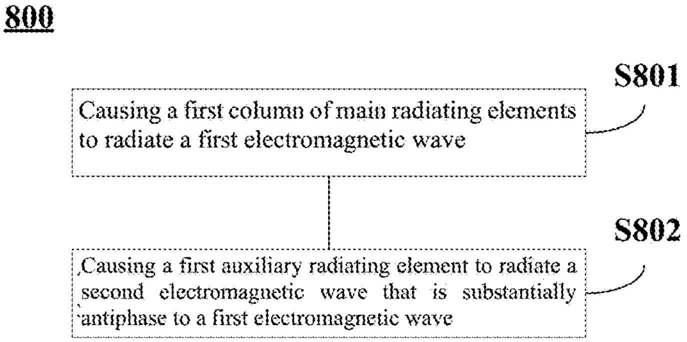
FIG. 10 is a flowchart showing a method of operating an antenna according to some embodiments of the present disclosure.

In addition, the present disclosure further provides a method of operating an antenna as described in any of the aforementioned embodiments. FIG. 10 shows a method 800 of operating an antenna according to an embodiment of the present disclosure. The antenna includes at least one column of main radiating elements, and each main radiating element of the at least one column of main radiating elements is configured to operate in a first operating frequency band, wherein, a first main radiating element in a first column of main radiating elements of the at least one column of main radiating elements has a first auxiliary radiating element arranged adjacent to the first main radiating element. The method 800 includes: in step S801, causing the first column of main radiating elements to radiate a first electromagnetic wave; and in step S802, causing the first auxiliary radiating element to radiate a second electromagnetic wave that is substantially antiphase to the first electromagnetic wave.

The terms "left", "right", "front", "rear", "top", "bottom", "upper", "lower", "high", "low" in the descriptions and claims, if present, are used for descriptive purposes and not necessarily used to describe constant relative positions. It should be understood that the terms used in this way are interchangeable under appropriate circumstances, so that the embodiments of the present disclosure described herein, for example, can operate on other orientations that differ from those orientations shown herein or otherwise described. For example, when the device in the drawing is turned upside down, features that were originally described as "above" other features can now be described as "below" other features. The device may also be oriented in other directions (rotated by 90 degrees or in other orientations), and in this case, a relative spatial relation will be explained accordingly.

In the descriptions and claims, when an element is referred to as being "above" another element, "attached" to another element, "connected" to another element, "coupled" to another element, or "contacting" another element", the element may be directly above another element, directly attached to another element, directly connected to another element, directly coupled to another element, or directly contacting another element, or there may be one or multiple intermediate elements. In contrast, if an element is described "directly" "above" another element, "directly attached" to another element, "directly connected" to another element, "directly coupled" to another element or "directly contacting" another element, there will be no intermediate elements. In the descriptions and claims, a feature that is arranged "adjacent" to another feature, may denote that a feature has a part that overlaps an adjacent feature or a part located above or below the adjacent feature.

As used herein, the word "exemplary" means "serving as an example, instance, or illustration" rather than as a "model" to be copied exactly. Any realization method described exemplarily herein is not necessarily interpreted as being preferable or advantageous over other realization methods. Moreover, the present disclosure is not limited by any expressed or implied theory given in the technical field, background art, summary of the invention, or specific implementation methods.

As used herein, the word "basically" means inclusion of any minor changes caused by design or manufacturing defects, device or component tolerances, environmental influences, and/or other factors. The word "basically" also allows the gap from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "include/comprise" is used in this text, it indicates the presence of the specified feature, entirety, step, operation, unit and/or component, but does not exclude the presence or addition of one or more other features, entireties, steps, operations, units and/or components and/or combinations thereof.

In the present disclosure, the term "provide" is used in a broad sense to cover all ways of obtaining an object, so "providing an object" includes but is not limited to "purchase", "preparation/manufacturing", "arrangement/setting", "installation/assembly", and/or "order" of the object, etc.

As used herein, the term "and/or" includes any and all combinations of one or more of the associated listed items. The terms used herein are only for the purpose of describing specific embodiments, and are not intended to limit the present disclosure. As used herein, the singular forms "a", "an" and "the" are also intended to include the plural forms, unless the context clearly dictates otherwise.

Those skilled in the art should realize that the boundaries between the above operations are merely illustrative. A plurality of operations can be combined into a single operation, which may be distributed in the additional operation, and the operations can be executed at least partially overlapping in time. Also, alternative embodiments may include multiple instances of specific operations, and the order of operations may be changed in other various embodiments. However, other modifications, changes and substitutions are also possible. Aspects and elements of all embodiments disclosed above may be combined in any manner and/or in conjunction with aspects or elements of other embodiments to provide multiple additional embodiments. Therefore, the description and drawings hereof should be regarded as illustrative rather than restrictive.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

That which is claimed is:

1. An antenna, including:

a first column of main radiating elements, each main radiating element configured to operate in a first operating frequency band; and a first auxiliary radiating element, wherein the first auxiliary radiating element is adjacent a first main radiating element in the first column of main radiating elements, and the first auxiliary radiating element is configured to radiate an electromagnetic wave that is substantially antiphase to an electromagnetic wave radiated by the first main radiating element, wherein the first auxiliary radiating element is rotated 180° relative to the first main radiating element, and wherein the first main radiating element is configured to be fed with a first component of a signal, the first auxiliary radiating element is configured to be fed with a second component of the signal, and the first component and the second component of the signal are in phase with each other.

2. The antenna according to claim 1, wherein the first auxiliary radiating element is adjacent the first main radiating element in a direction perpendicular to an axis defined by the first column of main radiating elements.

3. The antenna according to claim 1, wherein the first main radiating element and the first auxiliary radiating element are respectively connected to a first output terminal and a second output terminal of a power splitter, and outputs of the power splitter at the first output terminal and the second output terminal are in phase with each other.

4. The antenna according to claim 1, wherein the first main radiating element and the first auxiliary radiating element are respectively connected to corresponding output terminals of an in-phase coupler.

5. An antenna, including:

a first column of main radiating elements, each main radiating element configured to operate in a first operating frequency band; and a first auxiliary radiating element, wherein the first auxiliary radiating element is adjacent a first main radiating element in the first column of main radiating elements, and the first auxiliary radiating element is configured to radiate an electromagnetic wave that is substantially antiphase to an electromagnetic wave radiated by the first main radiating element, wherein the first auxiliary radiating element is oriented in the same direction as the first main radiating element, and wherein the first main radiating element is connected to a first output terminal of a power splitter and is configured to be fed with a first component of a signal, the first auxiliary radiating element is connected to a second output terminal of the power splitter via a phase modulation circuit and is configured to be fed with a second component of the signal, and the first component and the second component of the signal are substantially antiphase to each other, and wherein a phase difference between the first component and the second component is completely provided by the phase modulation circuit.

6. The antenna according to claim 5, wherein a phase difference between the first component and the second component of the signal is between 160° to 180°.

7. The antenna according to claim 5, wherein, outputs of the power splitter at the first output terminal and the second output terminal are in phase with each other.

8. The antenna according to claim 7, wherein the power splitter is an in-phase coupler.

9. An antenna, including:

a first column of main radiating elements, each main radiating element configured to operate in a first operating frequency band;

a first auxiliary radiating element; and a second column of main radiating elements that is adjacent the first column of main radiating elements;

wherein the first auxiliary radiating element is adjacent a first main radiating element in the first column of main radiating elements, and the first auxiliary radiating element is configured to radiate an electromagnetic wave that is substantially antiphase to an electromagnetic wave radiated by the first main radiating element, wherein the first auxiliary radiating element is oriented in the same direction as the first main radiating element, and wherein the first main radiating element is configured to be fed with a first component of a signal, the first auxiliary radiating element is configured to be fed with a second component of the signal, and the first component and the second component of the signal are substantially antiphase to each other, wherein the first main radiating element is connected to a first output terminal of a power splitter, the first auxiliary radiating element is connected to a second output terminal of the power splitter via a phase modulation circuit, and the phase modulation circuit is configured such that the first component fed into the first main radiating element and the second component fed into the first auxiliary radiating element are substantially antiphase to each other, wherein outputs of the power splitter at the first output terminal and the second output terminal have different phases, wherein the first column of main radiating elements and the second column of main radiating elements are fed separately, wherein a main radiating element in the second column of main radiating elements corresponding to the first main radiating element is adjacent the first auxiliary radiating element, and wherein the first auxiliary radiating element is configured to radiate an electromagnetic wave that is substantially antiphase to an electromagnetic wave radiated by the main radiating element in the second column of main radiating elements corresponding to the first main radiating element.

10. The antenna according to claim 9, wherein, the second component of the signal has an amplitude that is less than 10% of an amplitude of the first component of the signal.

11. The antenna according to claim 9, wherein, the first main radiating element is an uppermost main radiating element or a lowermost main radiating element in the first column of main radiating elements.

12. The antenna according to claim 9, further comprising a second auxiliary radiating element, wherein, the second auxiliary radiating element is adjacent a second main radiating element that is different from the first main radiating element in the first column of main radiating elements, and the second auxiliary radiating element is configured to radiate an electromagnetic wave that is substantially antiphase to an electromagnetic wave radiated by the second main radiating element.

13. The antenna according to claim 12, wherein the second main radiating element is closer to a central portion of the first column of main radiating elements than the first main radiating element, and an amplitude of a signal component fed to the second auxiliary radiating element is smaller than that of a signal component fed to the first auxiliary radiating element.

14. The antenna according to claim 9, wherein the first auxiliary radiating element is between the first column of main radiating elements and the second column of main radiating elements and positioned either above or below the first column of main radiating elements and the second column of main radiating elements.

15. The antenna according to claim 9, further comprising a first column of second frequency band main radiating elements, each second frequency band main radiating element configured to operate in a second operating frequency band different from the first operating frequency band.

16. An antenna, including:

a first column of main radiating elements, each main radiating element configured to operate in a first operating frequency band;

a first auxiliary radiating element;

a second column of main radiating elements that is adjacent the first column of main radiating elements; and a third auxiliary element, wherein the first auxiliary radiating element is adjacent a first main radiating element in the first column of main radiating elements, and the first auxiliary radiating element is configured to radiate an electromagnetic wave that is substantially antiphase to an electromagnetic wave radiated by the first main radiating element, wherein the first auxiliary radiating element is oriented in the same direction as the first main radiating element, and wherein the first main radiating element is configured to be fed with a first component of a signal, the first auxiliary radiating element is configured to be fed with a second component of the signal, and the first component and the second component of the signal are substantially antiphase to each other, wherein the first main radiating element is connected to a first output terminal of a power splitter, the first auxiliary radiating element is connected to a second output terminal of the power splitter via a phase modulation circuit, and the phase modulation circuit is configured such that the first component fed into the first main radiating element and the second component fed into the first auxiliary radiating element are substantially antiphase to each other, wherein outputs of the power splitter at the first output terminal and the second output terminal have different phases, wherein the first column of main radiating elements and the second column of main radiating elements are fed separately, wherein the third auxiliary radiating element is adjacent a third main radiating element in the second column of main radiating elements, and the third auxiliary radiating element is configured to radiate an electromagnetic wave that is substantially antiphase to an electromagnetic wave radiated by the third main radiating element, and wherein the first column of main radiating elements and the second column of main radiating elements are vertically shifted relative to each other, the first auxiliary radiating element is located above the second column of main radiating elements, and the third auxiliary radiating element is located below the first column of main radiating elements.

17. An antenna, including:

a first column of main radiating elements, each main radiating element configured to operate in a first operating frequency band;

a first auxiliary radiating element;

a second column of main radiating elements;

a third column of main radiating elements;

a fourth column of main radiating elements; and a third auxiliary element, wherein the first auxiliary radiating element is adjacent a first main radiating element in the first column of main radiating elements, and the first auxiliary radiating element is configured to radiate an electromagnetic wave that is substantially antiphase to an electromagnetic wave radiated by the first main radiating element, wherein the first auxiliary radiating element is oriented in the same direction as the first main radiating element, and wherein the first main radiating element is configured to be fed with a first component of a signal, the first auxiliary radiating element is configured to be fed with a second component of the signal, and the first component and the second component of the signal are substantially antiphase to each other, wherein the first main radiating element is connected to a first output terminal of a power splitter, the first auxiliary radiating element is connected to a second output terminal of the power splitter via a phase modulation circuit, and the phase modulation circuit is configured such that the first component fed into the first main radiating element and the second component fed into the first auxiliary radiating element are substantially antiphase to each other, wherein outputs of the power splitter at the first output terminal and the second output terminal have different phases, wherein the first column of main radiating elements, the second column of main radiating elements, the third column of main radiating elements, and the fourth column of main radiating elements are arranged in the stated order adjacent one another in a direction transverse to an axis defined by the first column of main radiating elements and are fed separately, and the second column of main radiating elements and the fourth column of main radiating elements are vertically shifted relative to the first column of main radiating elements and the third column of main radiating elements, wherein a main radiating element in the third column of main radiating elements corresponding to the first main radiating element is adjacent the first auxiliary radiating element, the first auxiliary radiating element is configured to radiate an electromagnetic wave that is substantially antiphase to an electromagnetic wave radiated by the main radiating element in the third column of main radiating elements corresponding to the first main radiating element, and the first auxiliary radiating element is located above the second column of main radiating elements, wherein the third auxiliary radiating element is adjacent a third main radiating element in the second column of main radiating elements, and the third auxiliary radiating element is configured to radiate an electromagnetic wave that is substantially antiphase to an electromagnetic wave radiated by the third main radiating element, and wherein a main radiating element in the fourth column of main radiating elements corresponding to the third main radiating element is adjacent the third auxiliary radiating element, the third auxiliary radiating element is configured to radiate an electromagnetic wave that is substantially antiphase to an electromagnetic wave radiated by the main radiating element in the fourth column of main radiating elements corresponding to the third main radiating element, and the third auxiliary radiating element is located below the third column of main radiating elements.

* * * * *